US008839506B2

(12) United States Patent
Slater et al.

(10) Patent No.: US 8,839,506 B2
(45) Date of Patent: Sep. 23, 2014

(54) WIRE TERMINATION TOOL

(75) Inventors: Brett Hoe Slater, Mount Colah (AU); Bryce Nicholls, Green Point (AU)

(73) Assignee: ADC GmbH, Berlin (DE)

( * ) Notice: Subject to any disclaimer, the term of this patent is extended or adjusted under 35 U.S.C. 154(b) by 281 days.

(21) Appl. No.: 13/289,817

(22) Filed: Nov. 4, 2011

(65) Prior Publication Data

US 2012/0110837 A1 May 10, 2012

(30) Foreign Application Priority Data

Nov. 5, 2010 (AU) ................................ 2010241275

(51) Int. Cl.
*B23P 19/00* (2006.01)
*H01R 43/00* (2006.01)
*H01R 43/01* (2006.01)
*H01R 43/042* (2006.01)

(52) U.S. Cl.
CPC ............ *H01R 43/015* (2013.01); *H01R 43/042* (2013.01)
USPC ................ 29/750; 29/268; 29/566.4; 29/751; 29/753; 72/409.14

(58) Field of Classification Search
USPC ........ 29/750, 268, 566.4, 751, 753, 757, 760, 29/828, 861; 72/409.14, 409.16, 409.19
See application file for complete search history.

(56) References Cited

U.S. PATENT DOCUMENTS 119,837 A 10/1871 Forbes
4,467,516 A 8/1984 John et al.
4,571,764 A 2/1986 Chen et al.
4,627,150 A 12/1986 Burnett
5,168,592 A 12/1992 Jee
5,212,882 A 5/1993 Hamonko et al.
5,832,603 A 11/1998 Fallandy
6,698,090 B1 * 3/2004 Hsu ................................ 29/751
6,704,992 B2 3/2004 Minor
7,073,245 B2 7/2006 Alexander et al.
7,103,968 B2 9/2006 Karrasch
7,444,744 B2 11/2008 Caveney et al.
7,644,485 B2 1/2010 Muller et al.
2006/0107726 A1 5/2006 Heggemann et al.
2008/0313891 A1 12/2008 Caveney et al.
2010/0071202 A1 3/2010 Peng et al.

FOREIGN PATENT DOCUMENTS

EP 0 156 168 A2 10/1985
EP 1 008 209 B1 4/2002
EP 1 659 663 A2 5/2006

OTHER PUBLICATIONS

European Search Report for Application No. 11008723.6 mailed Feb. 3, 2012.

* cited by examiner

*Primary Examiner* — Thiem Phan
(74) *Attorney, Agent, or Firm* — Merchant & Gould P.C.

(57) ABSTRACT

A tool for pushing a wire termination head holder towards a connector holder, the tool including a first arm and a second arm; a first assembly mechanically coupling the head holder to the first arm, and a second assembly mechanically coupling the head holder to the second arm, wherein a relative movement of the first and second arms causes both of the first and second assemblies to push the head holder towards the connector holder.

15 Claims, 10 Drawing Sheets

WIRE TERMINATION TOOL

This application claims benefit of Serial No. 2010241275, filed 5 Nov. 2010 in Australia and which application(s) are incorporated herein by reference. To the extent appropriate, a claim of priority is made to each of the above disclosed applications.

TECHNICAL FIELD OF THE INVENTION

The present invention relates to a tool for pushing a wire termination head holder towards a connector holder, for example a holder adapted to hold an insulation displacement connector.

BACKGROUND OF THE INVENTION

Electronic devices, such as telecommunications devices, may be connected to other such devices either wirelessly or using a wired connection. Wired connections make use of connecting cables, which may be attached to electronic devices by means of a connector or jack conforming to a predefined standard. Using connectors or jacks to connect a cable with a device facilitates easy connection and disconnection of the cable with the device, and allows the cables to be manufactured as standard, commodity items.

Connecting cables, such as telecommunications cables, often consist of one or more wires encased by a sheath. For example, Category 5 computer network cable consists of 8 individually insulated wires within a sheath. If connectors were not used to connect this cable to computer network devices, such as routers or switches, each of the 8 wires would need to be individually attached to each device.

Connectors standardise the cable ends and expose the wires in a predefined physical arrangement. This enables the cable end having a connector to be simply plugged in to a device having a corresponding connector to create a physical connection between the device and the wires within the cable. Examples of such connectors are RJ-45 and RJ-11 plugs (male connectors) and sockets (female connectors).

Although cable connectors facilitate the connection of a cable to a device, the wires within the cable still need to be connected to the connector. This may be done in a variety of ways. One way is to use an insulation displacement connector. Such connectors have an arrangement of conducting blades that cut through (or displace) the insulation on each wire to electrically connect to the wire. Wires are connected to the insulation displacement connector by pushing the wires into the conducting blade locations to cause the blades to cut through the insulation.

Despite this convenient method of connecting each wire to the connector, it remains tedious and time consuming to push each wire of a multi-wire cable into each conducting blade location, especially as this requires significant force.

It is generally desirable to overcome or ameliorate one or more of the above mentioned difficulties, or at least provide a useful alternative.

SUMMARY OF THE INVENTION

The present invention provides a tool for pushing a wire termination head holder towards a connector holder, the tool including:

a first arm and a second arm;

a first assembly mechanically coupling the head holder to the first arm, and a second assembly mechanically coupling the head holder to the second arm, wherein a relative movement of the first and second arms causes both of the first and second assemblies to push the head holder towards the connector holder.

BRIEF DESCRIPTION OF THE DRAWINGS

Preferred embodiments of the present invention are hereafter described, by way of non-limiting example only, with reference to the accompanying drawings in which.

DETAILED DESCRIPTION OF PREFERRED EMBODIMENTS OF THE INVENTION

Figure 1:
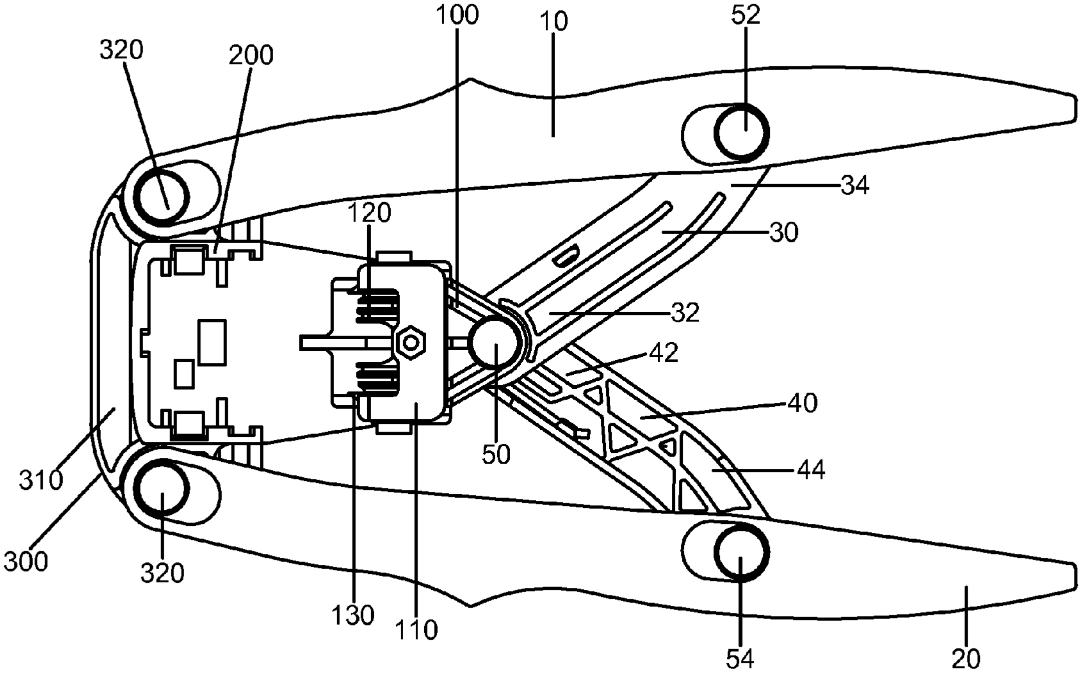
FIG. 1 is a top-down view of a tool for pushing a wire termination head holder towards a connector holder, in an open position.
Figure 2:
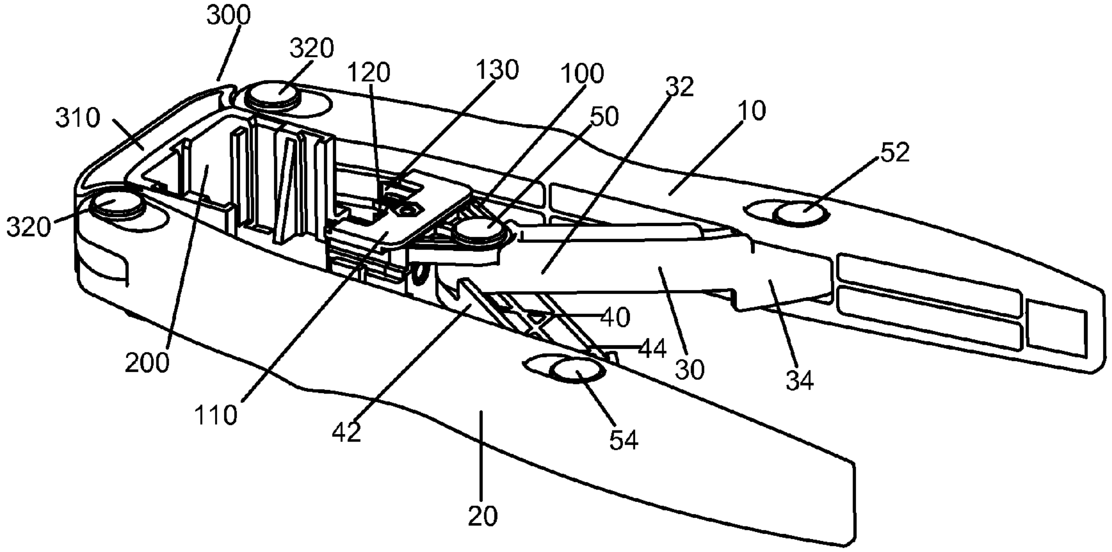
FIG. 2 is an isometric view of the tool of FIG. 1.
Figure 3:
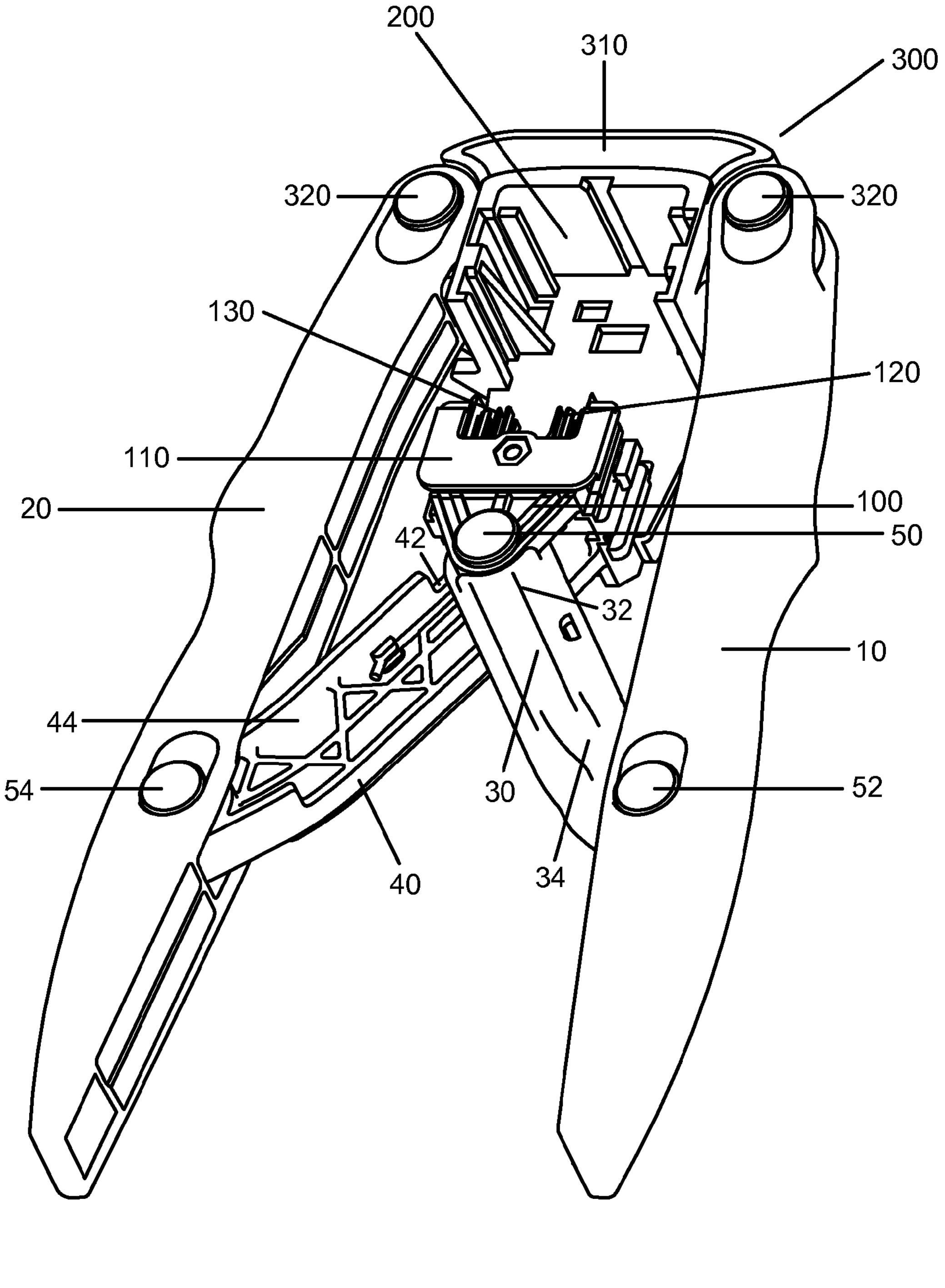
FIG. 3 is a further isometric view of the tool of FIGS. 1 and 2.
Figure 4:
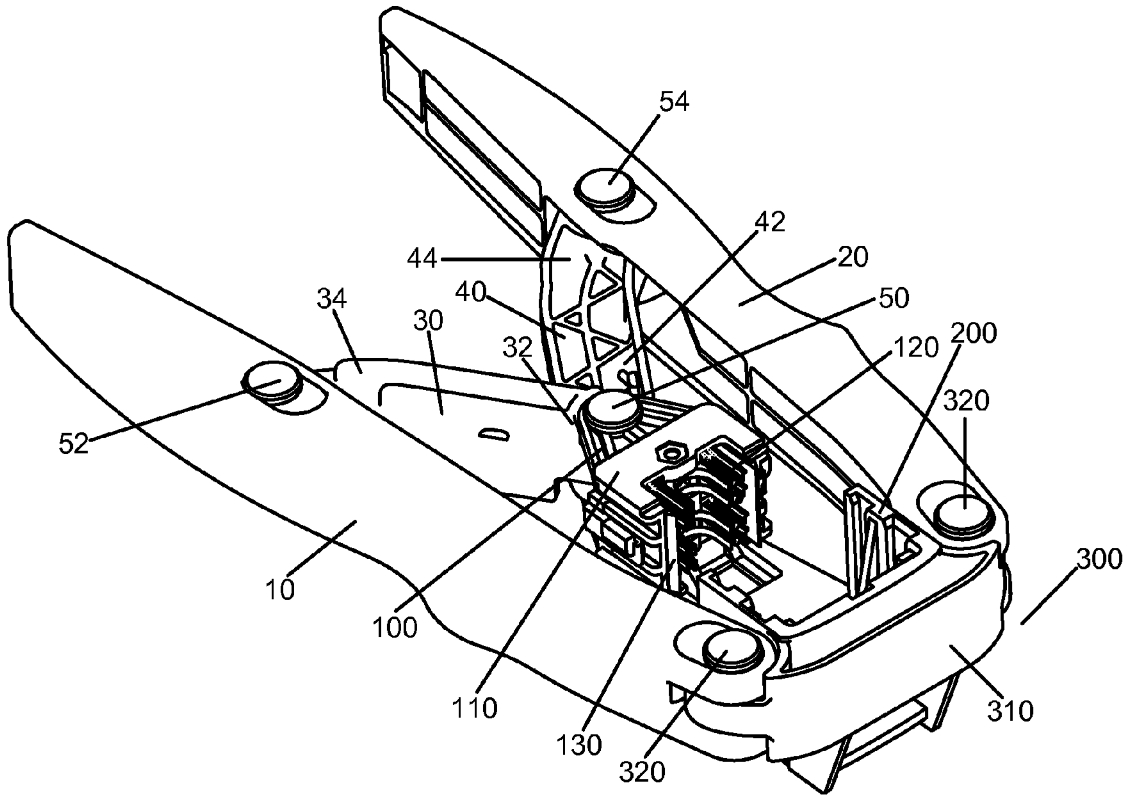
FIG. 4 is a further isometric view of the tool of FIGS. 1-3.

As illustrated in FIGS. 1 to 5 (in which like numerals relate to like components), a tool for pushing a wire termination head holder 100 towards a connector holder 200 includes a first arm 10 and a second arm 20. The first arm 10 is opposed to the second arm 20 to facilitate relative movement of the first arm 10 and second arm 20.

The first arm 10 is mechanically coupled to the wire termination head holder 100 by a first assembly 30 in the form of an elongate lever. Similarly, the second arm 20 is mechanically coupled to the wire termination holder 100 by a second assembly 40, also in the form of an elongate lever.

Figure 5:
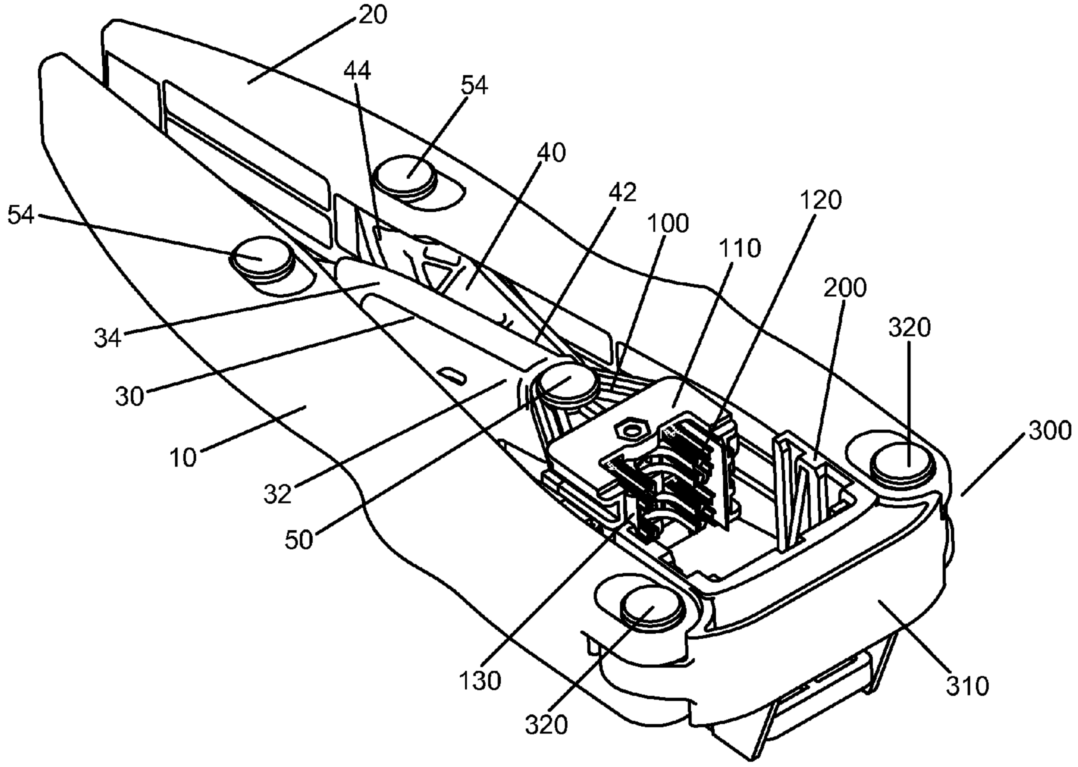
FIG. 5 is an isometric view of the tool of FIGS. 1-4, in a closed position.

FIGS. 1 to 4 show the tool in an open position. When the arms 10, 20 are squeezed together, both the first assembly 30 and the second assembly 40 exert a force on the head holder 100 to push it towards the connector holder 200. FIG. 5 shows the tool in its closed position, where the arms 10, 20 have been squeezed together.

Although in this embodiment the movement of the arms 10, 20 towards each other causes the first and second assemblies 30, 40 to exert a force on the head holder 100 to push it towards the connector holder 200, the tool may be configured such that any relative movement (for example, a movement apart) of the arms 10, 20 has this effect.

Now considering the tool in more detail, first assembly 30 includes a first elongate lever extending between a first inner portion 32 and a first outer portion 34. Similarly, the second assembly 40 includes a second elongate lever extending between second inner portion 42 and a second outer portion 44. The first elongate lever 30 is mechanically coupled to arm 10 at the first outer portion 34 by arm pivot joint 52, and the second elongate lever 40 is mechanically coupled to arm 20 at the second outer portion 44 by arm pivot joint 54. Both the first elongate lever 30 and the second elongate lever 40 are mechanically coupled to the head holder 100 by a single common head pivot joint 50 at the first inner portion 32 of the first elongate lever 30, and second inner portion 42 of the second elongate lever portion 40.

Although the tool described above uses a single common head pivot joint 50, the first elongate lever 30 and the second elongate lever 40 may be mechanically coupled to the head holder 100 by more than one head pivot joint.

The pivot joints 50, 52, 54 allow rotational movement of the elongate levers 30, 40 around the pivots joints 50, 52, 54, but this rotational movement is limited to substantially a single plane. For example, first elongate lever 30 can move in the plane common to arms 10, 20, and rotate around arm pivot joint 52 and head pivot joint 50, Similarly, second elongate lever 40 can move in the plane common to arms 10, 20 and can rotate around arm pivot joint 54 and head pivot joint 50.

The effect of this arrangement may be explained with reference to FIG. 1. As arms 10 and 20 are squeezed together (or at least a portion of each them is caused to move towards the other), elongate arm 30 pivots in a clockwise direction around arm pivot joint 52, and in a clockwise direction around head pivot joint 50. Similarly, elongate arm 40 pivots in an anti-clockwise direction around arm pivot joint 54, and in an anti-clockwise direction around head pivot 50. This dual pivoting by each elongate arm 30, 40 causes both elongate arms 30, 40 to push the head holder 100 towards the connector holder 200.

As illustrated in FIGS. 1-5, first arm 10 and second arm 20 are mechanically coupled to each other at an apex portion 300 of the tool by an intermediate apex assembly 310. Intermediate apex assembly 310 is connected to first arm 10 and second arm 20 by pivot joints 320. In operation, the portions of first arm 10 and second arm 20 adjacent to pivot joints 320 do not move relative to each other. It is the relative movement of the portion of arm 10 proximate to arm pivot joint 52, and the portion of arm 20 proximate to arm pivot joint 54 that causes the elongate arms 30, 40 to push the head holder 100 towards the connector holder 200.

The connector holder 200 is located in or adjacent to the apex portion 300, the relative movement of at least a portion of first arm 10 and second arm 20 causing both of first assembly 30 and second assembly 40 to push the head holder 100 towards the apex portion 300. The intermediate apex assembly 310 provides a structure against which the connector holder 200 (and the connector held by connector holder 200) may be pushed by the wire termination head 110 held by the wire termination head holder 100.

The wire termination head 110 has one or more insertion blades 120 for pushing one or more wires into one or more insertion positions on an insertion displacement connector releasably held in connector holder 200. The wire termination head 110 also has one or more cutting blades 130 for cutting at least one of the one or more wires to reduce the length of the least one wire extending from the connector.

In operation, the wire termination head 110 is releasably held in wire termination head holder 100. An insulation displacement connector is releasably held by connector holder 200. The wires to be connected to the insulation displacement connector are placed in holding positions of the insulation displacement connector. Squeezing arms 10, 20 together causes assemblies 30, 40 to push the wire termination head holder 100 (and the wire termination head 110 held releasably therein) towards the insulation displacement connector. The insertion blades 120 push the wires placed in the holding positions deeper into the insulation displacement connector, causing the wire insulation to be displaced and the wires to be both mechanically and electrically coupled to the connector. Excess wire extending from the connector is cut by the cutting blades 130.

The pushing of the head holder 100 by both the first assembly 30 and the second assembly 40 has the advantage of the head holder 100 being subject to a greater pushing force than if only one of the first assembly 30 and the second assembly 40 was operative to push the head holder 100 towards the connector holder 200.

As described above, the head holder 100 and connector holder 200 releasably hold a wire termination head 110 and an insulation displacement connector (not shown) respectively. Both the wire termination head 110 and the insulation displacement connector are user-replaceable, enabling the tool to be used with a variety of different connectors.

Figure 6:
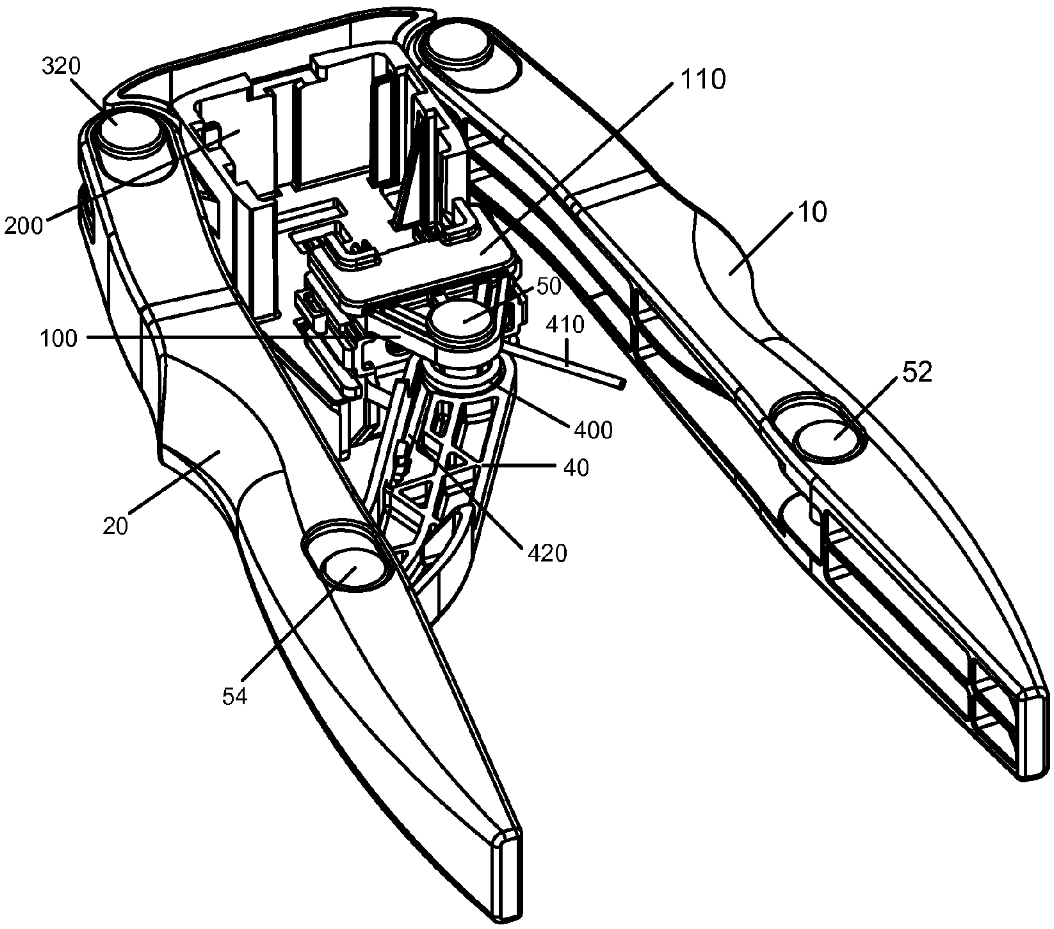
FIG. 6 is perspective view of the tool illustrated in FIGS. 1-5, with one of the arms of the tool not shown, and with a portion of the other arm not illustrated in order to reveal its internal structure.
Figure 7:
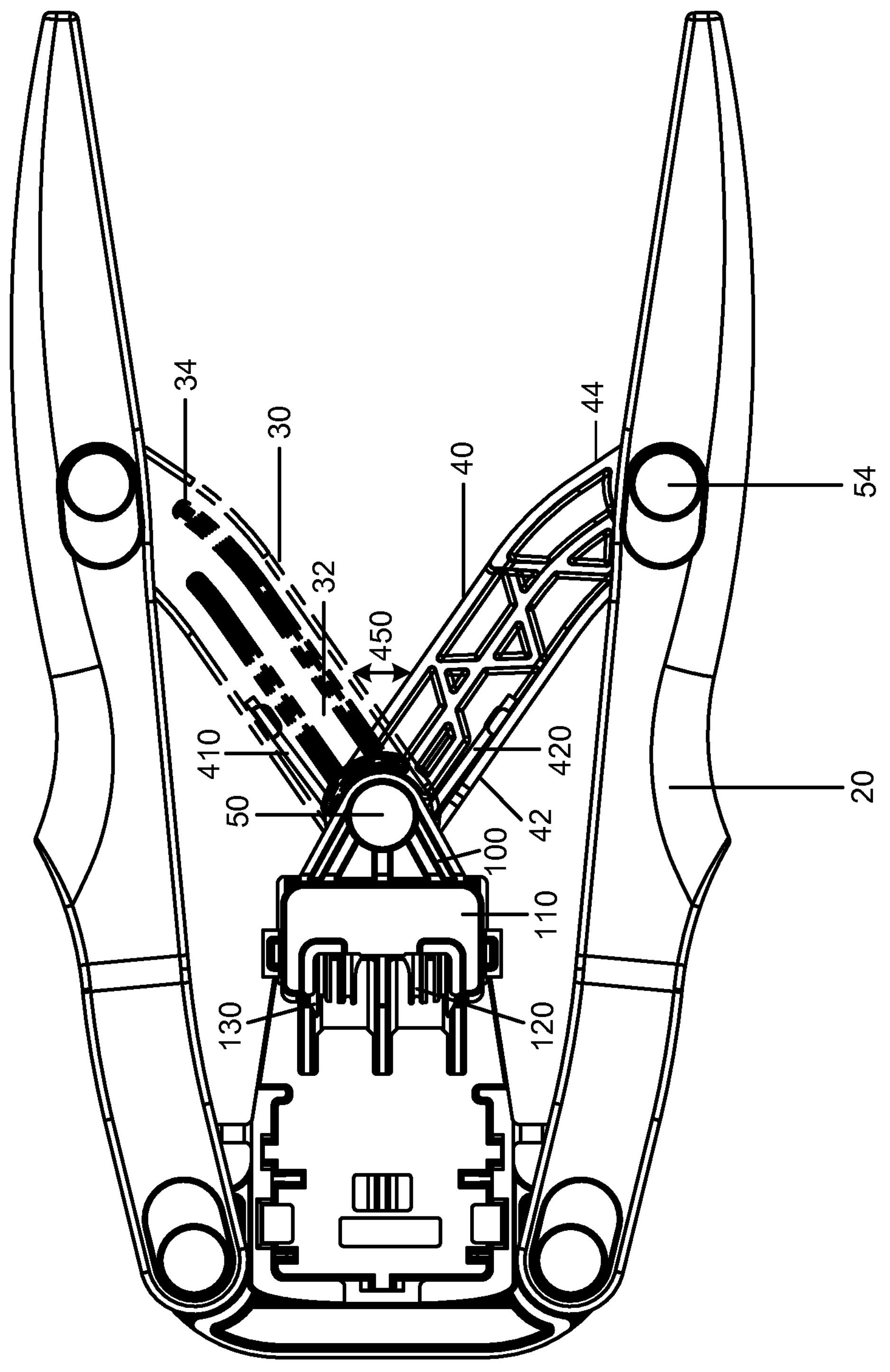
FIG. 7 is a top-down view of the tool illustrated in FIGS. 1-5, with one of the arms and a portion of the other arm not shown.

As illustrated in FIGS. 6 and 7, a biasing means in the form of a torsion spring 400 is provided to bias at least a portion of first arm 10 and second arm 20 apart. Although the biasing means takes the form of a single torsion spring 400 in the illustrated embodiment, more than one torsion spring may be used to bias at least a portion of first arm 10 and second arm 20 apart.

The torsion spring 400 is positioned around head pivot joint 50 and includes a first spring arm 410 and the second spring arm 420. First spring arm 410 is mechanically coupled to elongate arm 30, and second spring arm 420 is mechanically coupled to elongate arm 40 (as illustrated in FIG. 7). The torsion spring 400 resists relative movement of first arm spring 410 and second arm spring 420. Squeezing arms 10, 20 together reduces the internal angle 450 between first elongate arm 30 and second elongate arm 40, and causes first arm spring 410 and second arm spring 420 to move together. The torsion spring 400 operates to cause first arm spring 410 and second arm spring 420 to exert a force on first elongate arm 30 and second elongate arm 40 respectively with such that when arms 10, 20 are no longer the subject of a squeezing force, at least a portion of arms 10, 20 are pushed apart. This facilitates repetitive use of the tool, as the user need only apply a squeezing force to arms 10, 20, the tool reverting to its original shape when the squeezing force is removed.

Figure 8:
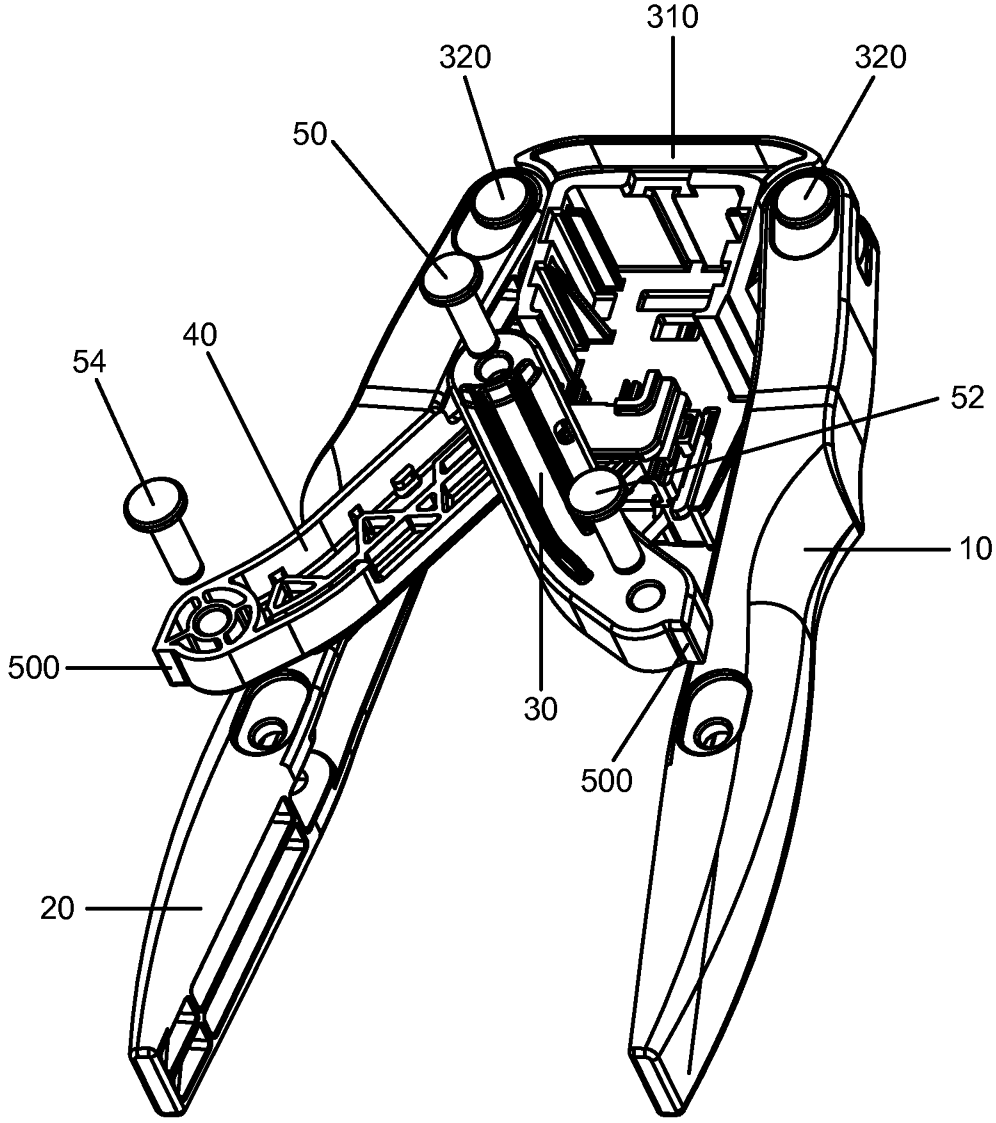
FIG. 8 is a partially exploded perspective view of the tool illustrated in FIGS. 1-5, with a portion of one of the arms not shown.

To ensure that first arm 10 and second arm 20 do not move overly far apart by virtue of the biasing means 400, first arm 10, second arm 20, or both are provided with arm movement limiting means. This arm movement limiting means may take the form of one or more stopper protrusions 500, as illustrated in FIGS. 8 & 9.

Figure 9:
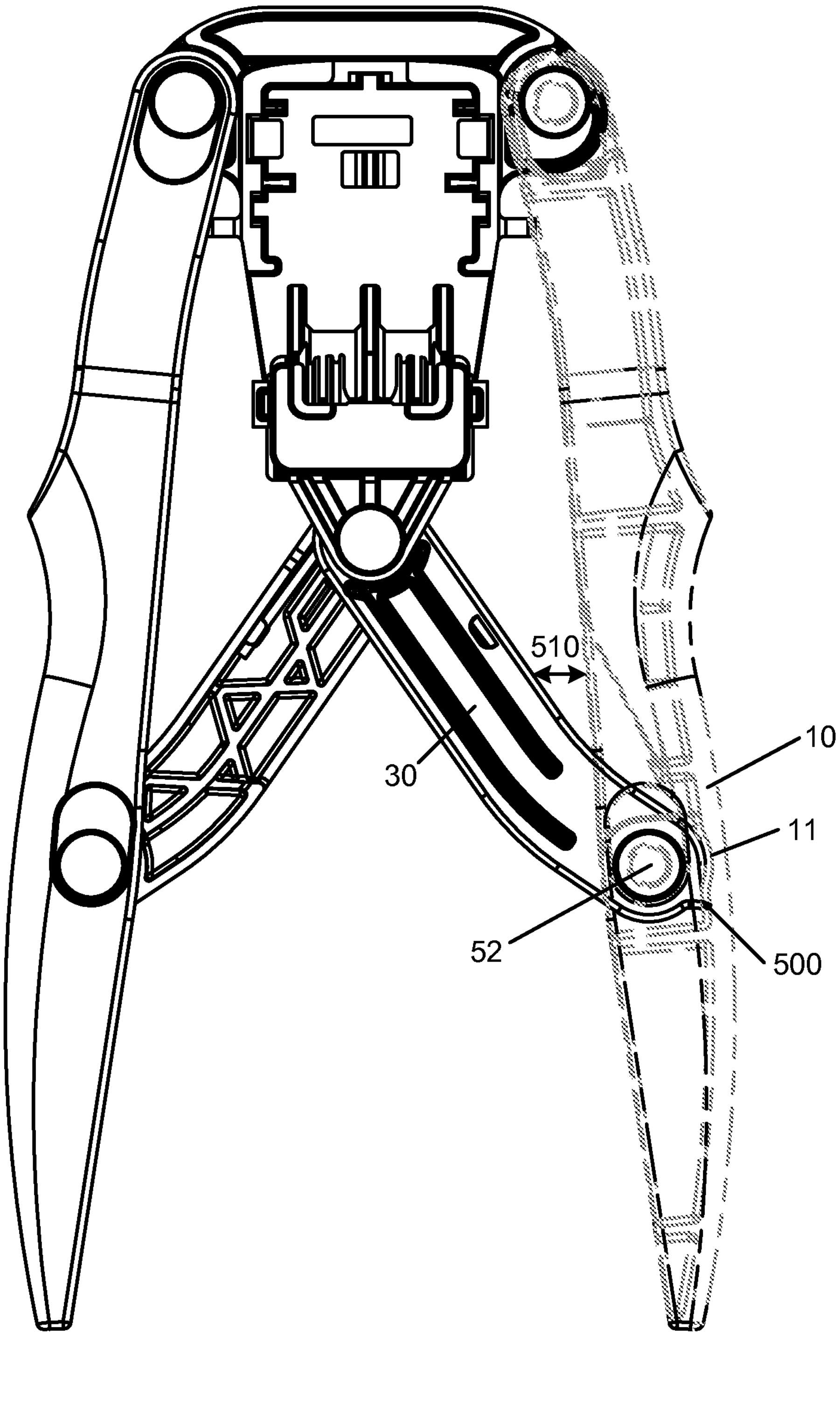
FIG. 9 is a top-down view of the tool illustrated in FIGS. 1-5 in which a portion of the arm is shown in faint lines to show the structure of the tool within the arm.

Although stopper protrusion 500 is preferably integrally formed with both the first elongate arm 30 and second elongate arm 40, to more clearly illustrate this feature only stopper protrusion 500 integrally formed with elongate arm 30 is illustrated in FIG. 9. Stopper protrusion 500 is positioned near arm pivot joint 52, and is in a position, and is of shape, to abut a portion of first arm 10 when the angle 510 between first arm 10 and elongate arm 30 becomes too great. Stopper protrusion 500 rotates around pivot joint 52, but such rotation is only possible until stopper protrusion 500 reaches a portion of first arm 10 which prevents its further rotation.

As the movement apart of at least a portion of first arm 10 and second arm 20 involves rotation of the stopper protrusion 500 around pivot joint 52, first on 10 and second arm 20 can only move apart to the extent that stopper protrusion 500 can continue to rotate around pivot joint 52 and is not prevented from doing so by a portion of first arm 10.

Where first arm 10 includes a hollow channel through which pivot joint 52 extends, the stopper protrusion 500 may be prevented from completely rotating around pivot joint 52 by an internal wall 11 of first arm 10.

Figure 10A:
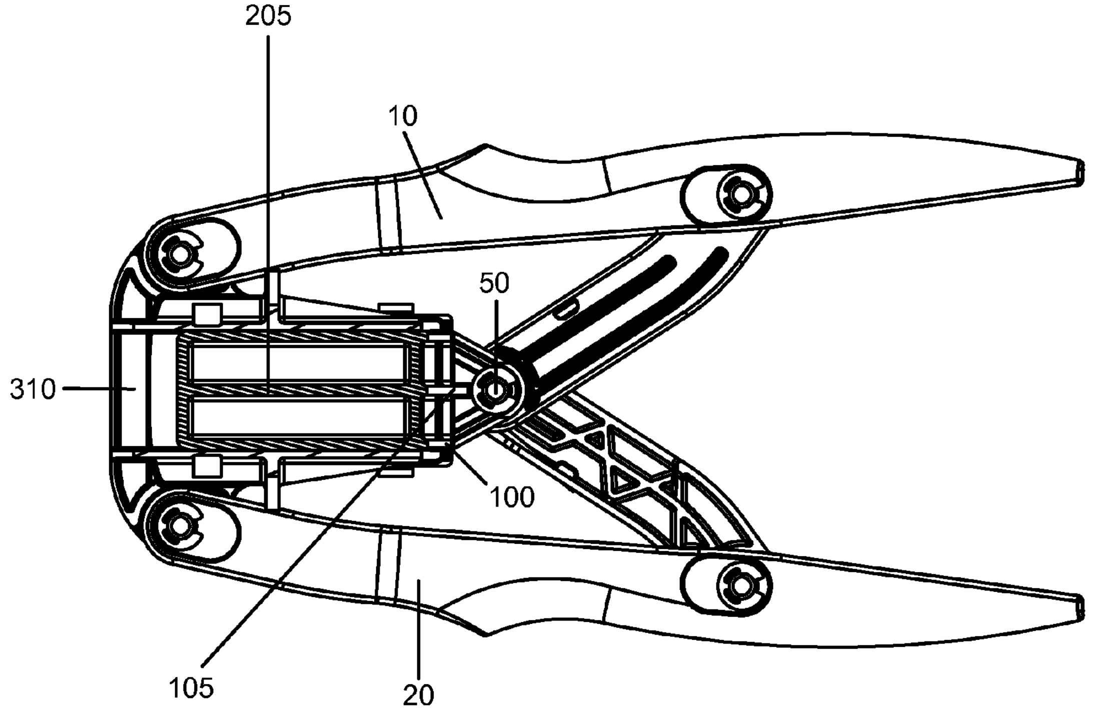
FIG. 10A is a top-down view of a cross-section of the tool illustrated in FIGS. 1-5 with the wire termination head holder and connector holder removed.
Figure 10B:
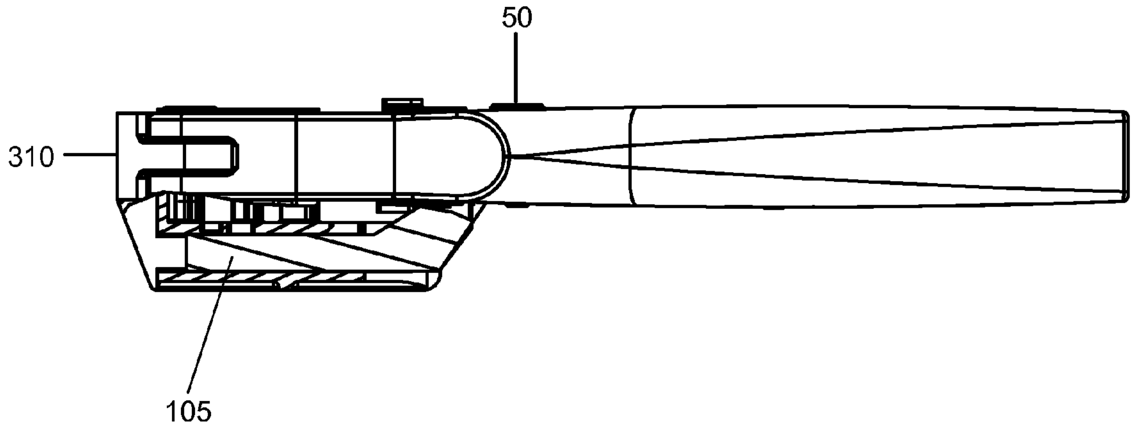
FIG. 10B is a side view of a cross-section of the tool illustrated in FIGS. 1-5 with the wire termination head holder and connector holder removed.

To restrict the rotation of wire termination head holder 100 around head pivot joint 50, and to constrain its path towards connector holder 200, wire termination head holder 100 may include a tongue 105, as illustrated in FIGS. 10A and 10B. When the wire termination head holder 100 is pushed towards the connector holder 200, tongue 105 travels within a longitudinal groove 205 in connector holder 200. By constraining the movement of tongue 105 to be within longitudinal groove 205, linear movement of wire termination head holder 100 towards connector holder 200 may be achieved.

Many modifications will be apparent to those skilled in the art without departing from the scope of the present invention. For example, stopper protrusions 500 may be replaced by one or more springs which operate to limit the effect of the torsion spring 400 and inhibit the movement apart of at least a portion of the first arm 10 and second 20.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

The invention claimed is:

1. A tool for pushing a wire termination head holder towards a connector holder, the tool comprising:

a first arm and a second arm;

a first assembly mechanically coupling the head holder to the first arm, and a second assembly mechanically coupling the head holder to the second arm, the first and second assemblies being mechanically coupled to the head holder at a common pivot joint to enable the first and second arms to move between a closed position and an open position;

a biasing member disposed at the common pivot joint that biases the first and second arms into the open position;

wherein a relative movement of the first and second arms to the closed position causes both of the first and second assemblies to push the wire termination head holder towards the connector holder.

2. The tool as claimed in claim 1, wherein the movement of at least a portion of both the first and second arm towards each other causes the first and second assemblies to exert a force on the head holder to push the head holder towards the connector holder.

3. The tool as claimed in claim 2, wherein the first assembly includes a first elongate lever extending between a first inner portion and a first outer portion, and the second assembly includes a second elongate lever extending between a second outer portion and a second inner portion.

4. The tool as claimed in claim 3, wherein the first elongate lever is mechanically coupled to the head holder at the first inner portion and mechanically coupled to the first arm at the first outer portion, and the second elongate lever is mechanically coupled to the head holder at the second inner portion and mechanically coupled to the second arm at the second outer portion.

5. The tool as claimed in claim 4, wherein the first and second elongate levers are connected to the first and second arms respectively by arm pivot joints that enable the first and second elongate levers to move relative to the first and second arms in substantially a single plane by pivoting at the arm pivot joints.

6. The tool as claimed in claim 3, wherein the first and second elongate levers are mechanically coupled to the head holder by at least one head pivot joint, such that the first and second elongate levers move relative to the head holder by pivoting in substantially a single plane at the at least one head pivot joint.

7. The tool as claimed in claim 2, wherein the first and second arms are mechanically coupled to each other at an apex portion of the tool.

8. The tool as claimed in claim 7, wherein the first and second arms are mechanically coupled to each other by an intermediate apex assembly.

9. The tool as claimed in claim 7, wherein the connector holder is located in or adjacent to the apex portion, and wherein a relative movement of the first and second arms causes both of the first and second lever assemblies to exert a force on the head holder to push the head holder towards the apex portion.

10. The tool as claimed in claim 1, wherein the connector holder is adapted to releasably hold an insulation displacement connector.

11. The tool as claimed in claim 10, wherein the wire termination head holder is adapted to releasably hold a wire termination head having one or more insertion blades for pushing one or more wires into one or more insertion positions of an insertion displacement connector.

12. The tool as claimed in claim 11, wherein the wire termination head includes one or more cutting blades for cutting at least one of the one or more wires to reduce the length of the at least one wire extending from the connector.

13. The tool as claimed in claim 1, wherein the biasing member includes at least one torsion spring.

14. The tool as claimed in claim 1, further including arm movement limiting means for limiting the effect of the biasing means and inhibiting the movement apart of the at least a portion of the first and second arms.

15. The tool as claimed in claim 1, wherein the connector holder is adapted to releasably hold a telecommunications jack.

* * * * *